US007106211B2

(12) United States Patent
Duvall

(10) Patent No.: US 7,106,211 B2
(45) Date of Patent: Sep. 12, 2006

(54) METHOD OF AND APPARATUS FOR VEHICLE INSPECTION AND THE LIKE WITH SECURITY FOR THE INSPECTOR AND FACILITY FOR RADIO TRACKING OF A VEHICLE ATTEMPTING ESCAPE FROM THE INSPECTOR

(75) Inventor: William Duvall, Sudbury, MA (US)

(73) Assignee: LoJack Corporation, Westwood, MA (US)

( * ) Notice: Subject to any disclaimer, the term of this patent is extended or adjusted under 35 U.S.C. 154(b) by 0 days.

(21) Appl. No.: 10/441,569

(22) Filed: May 20, 2003

(65) Prior Publication Data

US 2004/0233068 A1 Nov. 25, 2004

(51) Int. Cl.
*G08G 1/00* (2006.01)
*B60R 25/10* (2006.01)
*G08B 1/08* (2006.01)

(52) U.S. Cl. .............. 340/902; 340/426.1; 340/426.19; 340/539.13; 342/357.07

(58) Field of Classification Search ................ 340/902, 340/539.32, 425.5, 426.11, 426.12, 426.16, 340/426.17, 426.19, 825.36, 825.49, 825.72, 340/568.1, 825.69, 571, 572.1, 573.1, 426.1, 340/539.13; 180/271; 342/357.09, 357.07
See application file for complete search history.

(56) References Cited

U.S. PATENT DOCUMENTS

| | | | | |
|---|---|---|---|---|
| 5,703,598 | A * | 12/1997 | Emmons | 342/357.07 |
| 5,731,785 | A * | 3/1998 | Lemelson et al. | 342/357.07 |
| 5,825,283 | A * | 10/1998 | Camhi | 340/438 |
| 6,321,091 | B1 * | 11/2001 | Holland | 455/414.2 |
| 6,646,555 | B1 * | 11/2003 | Forster et al. | 340/572.8 |

* cited by examiner

*Primary Examiner*—Donnie L. Crosland
(74) *Attorney, Agent, or Firm*—Iandiorio & Teska

(57) ABSTRACT

A technique for adding to the security of vehicle inspection and the facility for radio-tracking of a vehicle attempting escape from the inspector, embodying the use of a miniaturized specifically coded self-powered radio-transponder or transmitter temporarily attachable by the inspector externally to a stopped vehicle and trackable in the event of vehicle escape.

22 Claims, 1 Drawing Sheet

Figure 1:
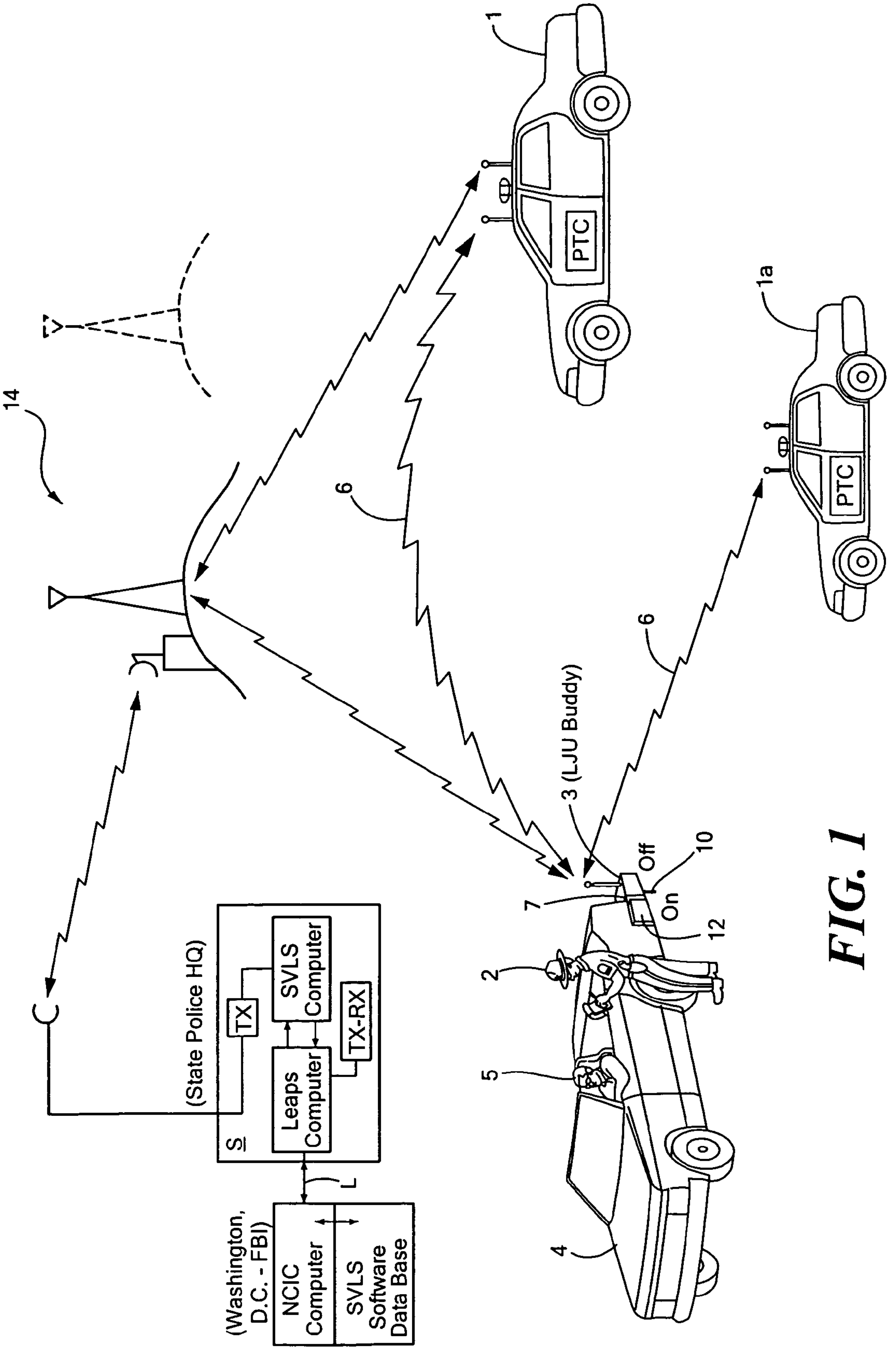

METHOD OF AND APPARATUS FOR VEHICLE INSPECTION AND THE LIKE WITH SECURITY FOR THE INSPECTOR AND FACILITY FOR RADIO TRACKING OF A VEHICLE ATTEMPTING ESCAPE FROM THE INSPECTOR

FIELD OF INVENTION

The invention relates generally to the inspection of tracked or stopped vehicles and the like by police or other inspectors, and more specifically to the problems of providing security to the inspector in approaching and engaging the vehicle operator together with the further providing of a facility for radio-tracking the stopped vehicle in the event of its taking off to escape the inspection process.

BACKGROUND

The problems of policing or other radio-tracking of stolen or errant vehicles protected, as from theft, by the pre-installation in the vehicle by the owner of appropriate coded radio transponders triggerable by police-controlled command broadcast radio signals to transmit periodic reply signals that may be received by police tracking vehicles, has been admirably solved by systems of the type described, for example, in U.S. Pat. Nos. 4,818,998 and 5,917,423 and widely commercially operated as the LoJack® system, offered by the common assignee of the present application. When the tracking vehicle is homing in on the errant vehicle, the command broadcast signal, by police request, may be modified automatically to accelerate the periodicity of the transponder reply signals from the vehicle further to facilitate the tracking, as is also described in such patents.

Should the operator of the vehicle try to avoid being apprehended by the tracking vehicle and speed away, even after feigning stopping, the tracking process can readily be resumed by the police, and with safety, and may also involve notification to other police trackers of the code transmissions of the errant vehicle transponder.

When, however, an errant vehicle is not pre-equipped by the owner with such a stealth-protection transponder, both the safety of the police officer leaving the tracker vehicle and approaching a stopped vehicle on foot for inspection, as for remedial action for improper or dangerous operation of the vehicle, and the subsequent capability of re-catching a vehicle that has sped away, with the concomitant dangers of a high-speed and/or evasive chase, may be seriously jeopardized.

It is particularly to this kind of situation of police vehicle inspection of stopped vehicles in general that the present invention is primarily directed, being concerned with a novel technique that not only protects an officer approaching a stopped vehicle on foot, but provides for the external radio-transponder triggering of the vehicle for subsequent tracking, should the operator of the stopped vehicle decide to take off.

OBJECTS OF INVENTION

It is a principal object of the present invention, accordingly, to provide a novel method of and apparatus for aiding the police or other inspection of stopped vehicles with safety for the approaching officer, and with the facility to attach a trackable transponder or transmitter externally to the vehicle as it is approached for inspection that will then permit subsequent tracking in the event the vehicle should speed off.

A further object is to provide a novel temporarily externally attachable and detachable coded radio transponder or transmitter to or from a vehicle to-be-inspected which may enable tracking in the event the vehicle takes off during the inspection.

Still another object is to provide such a novel transponder that may be remotely radio-commanded, as by a LoJack®-type broadcast network, to accelerate the periodicity of its transmissions, further to facilitate tracking.

Other and further objects will be hereinafter explained and more fully delineated in the appended claims.

SUMMARY

In summary, however, from one of its important aspects, the invention embraces a method of stopped vehicle and operator inspection by a police or other inspector, that comprises, while the inspector approaches the stopped vehicle, but before reaching the presence of the operator, temporarily attaching a specifically coded self-powered radio pulse transmitter externally to the vehicle and rearwardly of the position of the operator; activating the transmitter; then engaging the operator of the vehicle and conducting the inspection such that, in the event the operator attempts escape by driving off and/or attacking the inspector, the vehicle is trackable through the transmissions of the attached and activated transmitter, either by a vehicle of the inspector or by other radio-tracking vehicles; and wherein, upon completion of the inspection without hostile incident, the inspector removes and recovers the transmitter for future use and deactivates the same.

Preferred and best mode embodiments and designs for the technique and apparatus of the invention are more fully presented hereinafter.

DRAWINGS

The invention will now be described in connection with the accompanying drawing, the single FIGURE of which schematically illustrates the operation of the invention in preferred mode.

DESCRIPTION OF PREFERRED EMBODIMENTS OF THE INVENTION

As previously mentioned, there are various situations where a police officer or other inspector must approach a vehicle on foot and engage the vehicle operator in discussion during an inspection routine. One such frequently occurring situation is where a speeding or otherwise improperly operated car passes a police vehicle which then takes pursuit and pulls the car over to the side of the roadway. The officer is not sure who is behind the wheel—whether it is a felon, whether he is armed, whether he is sober or not, what his frame of mind may be, or whether he is aggressive or dangerous or not. There are, indeed, perhaps more police killed or wounded in routine stops of motor vehicles than in any other police activity. This invention, accordingly, is intended to provide an inspection technique and means of providing an increased degree of safety for the inspector, and with the elimination or minimizing of the dangers of engaging in a high-speed chase. This is accomplished by enabling the officer approaching the stopped vehicle temporarily externally to attach a miniature self-powered radio transponder or transmitter to the vehicle that is activated to broadcast a code that is uniquely assigned to the vehicle and can enable the police vehicle tracker to follow in the event the vehicle operator tries to escape.

In the event the police car is not equipped with direction-finding tracker equipment, the officer calls ahead to other police cars, including radio-tracking vehicles as of the type described in said patents, informing them that the escaping vehicle has been tagged with a transponder or transmitter emitting a particular code, and the initial direction or other conditions of the escaping vehicle.

An all-too-common scenario is one where the officer comes up to the door of the vehicle and knocks on the window. The operator rolls the window down and shoots the officer and takes off, but, in accordance with the invention, with the transponder unit attached to the car and broadcasting. The officer may call for help on his radio saying that he is shot, but that he has tagged the car with a particular coded activated radio pulse transmitter. Other police vehicles can then track down the errant vehicle.

In another scenario, the officer approaching and transponder-tagging the stopped vehicle may just be asking for a license and registration and then returning to the police car. The stopped vehicle operator may become nervous because he may have another violation of record, or even be wanted on a warrant. The officer doesn't know it yet, but the operator just takes off. With the invention, the policeman no longer has to chase; all he has to do is radio ahead and say this car has been tagged with a particular radio pulse reply code and is headed in a certain direction. In most cases, of course, after the officer gets the license and registration and goes back and runs the plate, there is no problem. The officer writes a warning, for example, and comes back and cautions the operator to slow down and have a nice day. As he is walking back, the officer detaches the radio transponder tag and deactivates or shuts it off.

Referring specifically to the drawing, a police radio tracker-equipped vehicle is shown at 1 on routine patrol, pulling over a suspect vehicle 4 for inspection or for some other reason. A police officer 2 leaves the vehicle 1 and approaches the suspect vehicle on foot, but not knowing the condition of the driver 5 with regard to the driver's legal status, mental condition, or whether he may be armed or otherwise dangerous. The police officer 2, as he approaches the vehicle 4 temporarily and surreptitiously where appropriate, attaches, unseen by the operator, a radio pulse transponder or transmitter 3 unit that he has first switched on using switch 10, behind the position of the operator at the steering wheel. This temporarily attaching may be to, for example, the rear bumper 12 of the suspect vehicle 4 by using a magnetized rubber mounting pad 7 similar, for example, to the magnetized rubber mounting pads used to attach antennas to the roof of cars and the like. Other adhesive or similar temporary attaching and removing steps or surfaces may also be used, if desired. The attached and activated transponder or transmitter 3, miniaturized and self-powered, begins transmitting a unique reply code signal 6 which is received by the police tracker computer-equipped law enforcement vehicle 1 or in fact any other law enforcement vehicle so equipped with police tracking computers, as described in said patents.

The inspecting law enforcement officer 2 then determines the disposition of the subject vehicle and driver or operator 5.

One of two conditions will occur. Normally if there are no incidents, the police officer completes the process of either writing a citation or not and handing such to the driver 5, and then, in the process of walking back to his vehicle, removes the temporarily attached transponder or transmitter 3, deactivating or switching it to the off position and terminating the transmission 6, ending this routine, with the transponder available for future re-use.

In the event, however, that the driver 5, such as because of an outstanding warrant or for any other reason, decides to depart the scene or to cause bodily harm to the officer 2, the tagging will then enable the future tracking by virtue of the coded transmissions, without the need for high-speed pursuit. In this event, after the driver has been detained and arrested, or some other disposition has occurred, the officer would remove the transponder or transmitter 3, switch it off to deactivate it and return it to his police vehicle 1 for future use.

In the event, however, that the driver in vehicle 4 should escape the range of the tracking vehicle receiver of the officer's tracking vehicle 1, it will then be possible, as is the case in any LoJack®-equipped network, e.g., network 14, or any other police tracker-equipped vehicle 1*a* as described in said patents, e.g., U.S. Pat. Nos. 4,818,998 and 5,917,423 discussed in the Background section, to receive the reply code. Having been notified through dispatch to be on the lookout for this particular reply code, other police tracker vehicles, e.g., vehicle 1*a*, would then be able to track, recover and detain the driver 5 whether it be in the state or out of state or in any other area.

Once the unit 3 has been switched on and attached to the stopped vehicle, it can then be operated through a broadcast command signal network or the LoJack® or other VHF controller network, e.g., network 14, so that it would then be possible to control the unit in addition to the portable unit manual on-off control mentioned earlier. It would be possible, for example, remotely to control the transponder unit 3 by broadcasting the appropriate command over the air from the tracking network 14 to speed up or accelerate the police reply rate of the transponder, further to aid in tracking, or to turn off or turn on the unit 3, and in any area where the LoJack®-type network, e.g., network 14, is operating, as described in said patents, e.g., U.S. Pat. Nos. 4,818,998 and 5,917,423 discussed in the Background section.

The invention thus enables, in its most simple mode, the on-off manual transmitter activating of a unit 3; or, more sophisticatedly, an on-off remote radio-signal control, and/or a reply pulse periodic rate control of a transponder unit 3 effected by tracker vehicle command, including through request of the LoJack®-type broadcast command network 14 of said patents as is fully described therein, e.g., U.S. Pat. Nos. 4,818,998 and 5,917,423 discussed in the Background section.

Further modifications will also occur to those skilled in this art, and such are considered to fall within the spirit and scope of the invention as defined in the appended claims.

What is claimed is:

1. A method of stopped vehicle and operator inspection by a police or other inspector, that comprises, while the inspector approaches the stopped vehicle, but before reaching the presence of the operator, temporarily attaching a specially coded self-powered radio pulse transmitter externally to the vehicle and rearwardly of the position of the operator; activating the transmitter; then engaging the operator of the vehicle and conducting the inspection such that, in the event the operator attempts escape by driving off and/or attacking the inspector, the vehicle is trackable through the transmissions of the attached and activated transmitter, either by a vehicle of the inspector or other radio-tracking vehicles; and wherein, upon completion of the inspection without hostile incident, the inspector removes and recovers the transmitter for future use and deactivates the same.

2. The method of claim 1 wherein the attaching and activating is effected surreptitiously.

3. The method of claim 1 wherein the transmitter is part of a transponder having a receiver, and the tracking includes sending control signals to the receiver to control the transmitting of the transponder.

4. The method of claim 3 wherein said control signals are requested by the tracking vehicle of a broadcast command signal network.

5. The method of claim 4 wherein said network is of the LoJack®-type stolen vehicle recovery network.

6. The method of claim 4 wherein said control signals comprise command signals to accelerate the periodicity of the radio pulse transmissions of the transponder transmitter, further to facilitate said tracking.

7. Apparatus for improving the safety of stopped vehicle and operator inspection by a police or other inspector having, in combination, a specially coded self-powered radio-pulse transmitter unit provided with means for enabling temporary external attachment to the vehicle by the inspector, rearwardly of the position of the operator in the vehicle; the transmitter unit having an external activating switch actuable to activate the transmitter when attached to the vehicle by the inspector; wherein, in the event the operator attempts escape by driving off and/or attacking the inspector, radio-tracking vehicles may track the vehicle through the transmissions of the attached and activated transmitter unit; and wherein, upon completion of an inspection without hostile incident, the transmitter unit may detachably be removed from the vehicle by the inspector for recovery for future use, with the switch enabling de-activation of the removed transmitter unit.

8. The apparatus of claim 7 wherein the attaching means is provided externally on the transmitter unit to enable surreptitious sticking of this unit as a tag to a rearward portion of the vehicle as the inspector approaches the operator.

9. The apparatus of claim 8 wherein the attaching means comprises a magnetic pad.

10. The apparatus of claim 7 wherein the transmitter unit is part of a transponder having also a receiver unit responsive to external radio-broadcast control signals to control the transmitter unit of the transponder.

11. The apparatus of claim 10 wherein said control signals are broadcast in response to requests by the tracking vehicle of a broadcast command signal network.

12. The apparatus of claim 11 wherein said network is of the LoJack®-type stolen vehicle recovery network.

13. The apparatus of claim 11 wherein said control signals comprise command signals to accelerate the periodicity of the radio pulse transmissions of the transponder transmitter unit, further to facilitate said tracking.

14. For use in improving the safety of stopped vehicle and operator inspection by a police or other inspector, apparatus comprising a specially coded self-powered transmitter radio-pulse unit provided externally with temporary attaching means to enable removably sticking the unit as a tag to a rearward portion of the vehicle as the inspector approaches the operator; and an externally operable switch means for inspector activation of a transmitter unit on attachment, and for subsequent deactivation of the transmitter unit upon detaching from the vehicle after the inspection to remove the tag for further use.

15. The apparatus of claim 14 wherein the transmitter unit is miniaturized to facilitate its surreptitious attachment to tag the vehicle.

16. For use in improving the safety of stopped vehicle and operator inspection by a police officer or other inspector, apparatus comprising a specially coded self-powered radio-pulse transponder unit having a transmitter unit and a receiver unit therein for controlling the transmitter unit in response to externally broadcast command signals; the transponder unit being externally provided with temporary attaching means to enable removably sticking the transponder unit as a tag to a portion of the vehicle as the inspector approaches the operator; and an externally operable switch means for inspector activation of the transponder unit on attachment, and for the subsequent de-activation of the transponder unit upon detaching from the vehicle after inspection to remove the tag for further use.

17. The apparatus of claim 16 wherein the transponder unit is miniaturized to facilitate its surreptitious attachment to tag the vehicle.

18. The apparatus of claim 16 wherein the attaching means comprises an external attaching surface or pad.

19. The apparatus of claim 16 wherein the broadcast command signals are broadcast in response to requests by a broadcast command signal network.

20. The apparatus of claim 19 wherein said network is of the LoJack®-type stolen vehicle recovery network.

21. The apparatus of claim 19 wherein said control signals comprise command signals to accelerate the periodicity of the radio-pulse transmissions of the transponder transmitter unit, further to facilitate said tracking, with the transponder receiver unit responsive to said command signals correspondingly to control within the transponder unit the transmitted radio pulse periodicity.

22. The apparatus of claim 16 wherein the transponder unit is miniaturized and battery self-powered to facilitate surreptitious attachment to tag the vehicle.

* * * * *